(12) United States Patent
Kawashima

(10) Patent No.: US 6,534,951 B2
(45) Date of Patent: Mar. 18, 2003

(54) BATTERY CHARGER

(75) Inventor: Nobuhiro Kawashima, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/025,034

(22) Filed: Dec. 19, 2001

(65) Prior Publication Data

US 2002/0074970 A1 Jun. 20, 2002

(30) Foreign Application Priority Data

Dec. 20, 2000 (JP) ........................................ 2000-386828

(51) Int. Cl.[7] .................................................. H02J 7/00

(52) U.S. Cl. ................................ 320/107; 320/DIG. 12

(58) Field of Search .......................... 320/107, DIG. 12

(56) References Cited

U.S. PATENT DOCUMENTS 5,734,254 A * 3/1998 Stephens .................... 320/106

\* cited by examiner

Primary Examiner—Gregory J. Toatley, Jr.
(74) Attorney, Agent, or Firm—Michael Best & Friedrich LLC

(57) ABSTRACT

A battery charger can avoid possibility of output shorting while the secondary battery is not connected and prevent use of a secondary battery other than dedicated one. The battery charger includes battery charging control means for supplying a charge current to a predetermined secondary battery via an output terminal, and output cut-off means for cutting off connection between the output terminal and the battery charging control means when the predetermined secondary battery is not loaded and for establishing connection between the output terminal and the battery charging control means when the predetermined secondary battery is loaded.

9 Claims, 6 Drawing Sheets

BATTERY CHARGER

BACKGROUND OF THE INVENTION

1. Field of the Invention

The present invention relates to a battery charger for charging a secondary battery.

2. Description of the Related Art

In the conventional battery charger, even when a secondary battery is in electrically non-connected condition, a voltage is output at an output terminal for charging as long as power is supplied to an input.

In most battery charger, when the secondary battery is not electrically connected, an output terminal for charging is held in exposed condition. Then, it is highly possible to cause shorting in the output terminal by metal or the like. As set forth above, even when the secondary battery is in electrically non-connected condition, the battery charger output voltage for charging. Therefore, once shorting of the output terminal is caused, abnormal heating is caused within the battery charger or thermal break down of the element in the battery charger can be caused.

On the other hand, the conventional battery charger can charge even for battery other than dedicated secondary battery. However, when the secondary battery other than dedicated secondary battery is erroneously charged, it is possibly cause lowering of performance of the secondary battery, cause damaging or leakage of the secondary battery.

SUMMARY OF THE INVENTION

The present invention has been worked out in view of the problem set forth above. It is therefore an object of the present invention to provide a battery charger which can avoid possibility of output shorting while the a secondary battery is not connected and prevent use of a secondary battery other than dedicated one.

In order to accomplish the above-mentioned and other objects, a battery charger comprises battery charging control means for supplying a charge current to a predetermined secondary battery via an output terminal, and output cut-off means for cutting off connection between the output terminal and the battery charging control means when the predetermined secondary battery is not loaded and for establishing connection between the output terminal and the battery charging control means when the predetermined secondary battery is loaded. As set forth above, the present invention is completely cut-off the output by the output cut-off means when the predetermined secondary battery is not loaded in the main body of the battery charger, and starts charging of the secondary batter by turning ON the power source line when the predetermined secondary battery is loaded.

On the other hand, as one example of construction of the battery charger according to the present invention, the output cut-off means has a contact inserted between the output terminal and the battery charging control means in series, and is constructed with a magnetic field detecting switch, such as a reed switch, which closes the contact when a magnetic field by magnetic field generating mean, such as a magnet, built in the predetermined secondary battery is detected.

On the other hand, as another example of construction of the battery charger according to the present invention, the output cut-off means has magnetic field detecting means, such as reed switch, Hall IC or the like, for detecting a magnetic field by magnetic field generating means built-in the predetermined secondary battery, and a switching element, such as field effect transistor or the like, inserted between the output terminal and the battery charging control means in series and connecting the output terminal and the battery charging control means when the magnetic field is detected by the magnetic field detecting means.

As a further example of the construction of the battery charger according to the present invention, the output cut-off means comprises a mechanical switch inserted between the output terminal and the battery charging control means in series and closing the contact in response to operation of a predetermined member provided in the predetermined secondary battery.

As a still further example of the construction of the battery charger according to the present invention, the predetermined member provided on the predetermined secondary battery is a projecting portion, and a recess to engage with the projecting portion is formed in a main body of the battery charger, and the mechanical switch is provided on a bottom of the recessed portion.

On the other hand, a yet further example of the construction of the battery charger according to the present invention, the output cut-off means comprises a mechanical switch opened and closed depending upon operation by a predetermined member arranged in the predetermined secondary battery, and a switching element inserted between the output terminal and the battery charging control means in series and establishing connection between the output terminal and the battery charging control means when the mechanical switch is placed in a condition indicative of loading of the predetermined secondary battery.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiments of a battery charger according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

First Embodiment

Figure 1A:
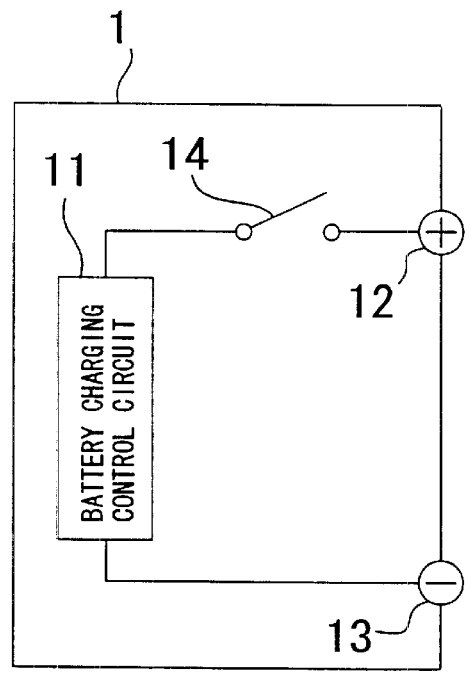
FIGS. 1A and 1B are block diagrams showing a construction of the first embodiment of a battery charger according to the present invention.
Figure 1B:
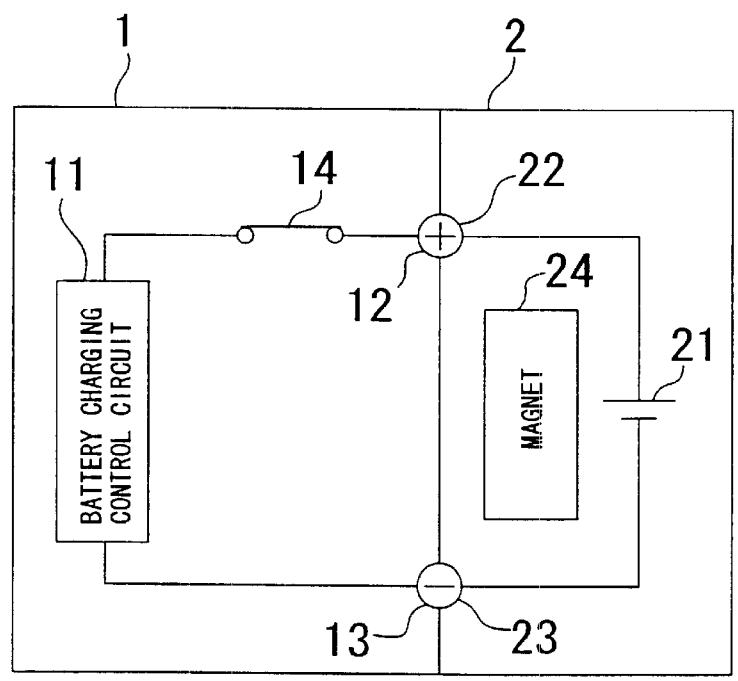
Figure 2:
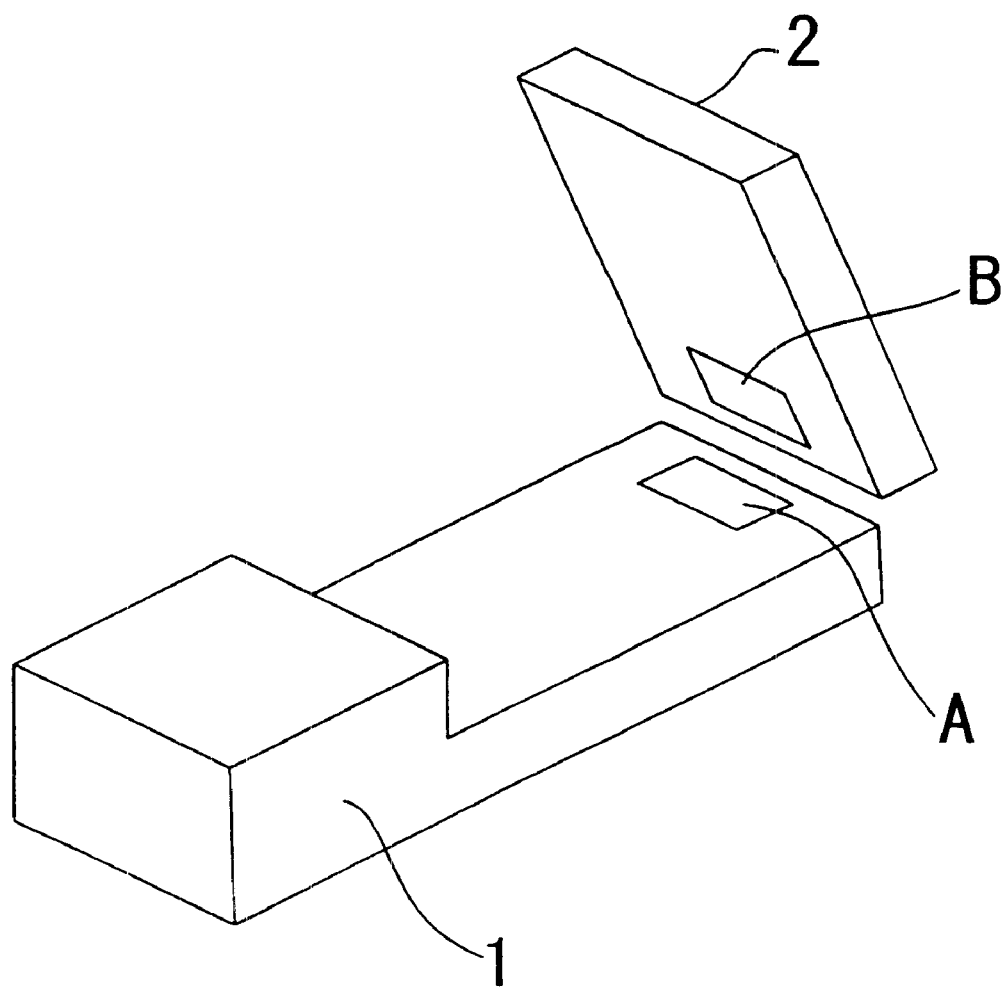
FIG. 2 is an external perspective view of the first embodiment of the battery charger according to the present invention, and a battery pack.

FIG. 1A is a block diagram showing a construction of the first embodiment of the battery charger according to the present invention, FIG. 1B is a block diagram showing a condition where a predetermined battery pack is connected to the battery charger of FIG. 1A, and FIG. 2 is an external perspective view of the first embodiment of the battery charger according to the present invention, and a battery pack. The shown embodiment of the battery charger 1 employs a reed switch 14 inserted into an output side power source line as an output cut-off means for cutting off an output when a predetermined battery pack 2 is not electrically connected.

Namely, the battery charger 1 includes a battery charging control circuit 11 outputting a charge current for charging the battery pack 2, a first output terminal 12 connected to an output on a positive side of the battery charging control circuit 11, a second output terminal connected to an output on a negative side of the battery charging control circuit 11, and a reed switch 14 inserted between the output terminal 12 and the battery charging control circuit 11 in series.

On the other hand, the battery pack 2 is a secondary battery dedicated for the battery charger 1 and includes a cell 21, a positive terminal 22 connected to a positive side of the cell 21, a negative terminal 23 connected to a negative side of the cell 21, and a magnet (permanent magnet) 23 placing a reed switch 14 of the battery charger 1.

In FIG. 2, the battery charger 1 is built in the reed switch 14 at a reed switch mounting position A of a main body. The battery pack 2 is built in a magnet 24 at a magnet mounting portion B shown in FIG. 2. The reed switch 14 is a parts to be activated in response to a strength of a magnetic field. Accordingly, it is desirable to determine the reed switch mounting position A and the magnetic mounting position B so that the magnet 24 is placed in close proximity to the reed switch 14 when the battery pack is loaded on the main body of the battery charger 1.

Next, operation of the shown embodiment of the battery charger 1 will be discussed. As shown in FIG. 1A, when the battery pack 2 is not loaded on the main body of the battery charger 1, since the reed switch 14 of the battery charger 1 is not subject to a magnetic force of the magnet 24 built in the battery pack 2, the reed switch 4 is held open condition. As a result, even when the battery charging control circuit 11 outputs a voltage, the output of the battery charger 1 is held off.

When the battery pack 2 is loaded on the main body of the battery charger 1, as shown in FIG. 1B, the output terminal 12 of the battery charger 1 and a positive terminal 22 of the battery pack 2 are connected. In conjunction therewith, the output terminal 13 of the battery charger 1 and the negative terminal 23 of the battery pack 2 are connected. Then, the reed switch 14 built in the main body of the battery charger 1 and the magnet 24 built in the battery pack 2 are placed close proximity witch each other. Then, the reed switch 14 is activated to be closed condition when it subject to a magnetic force greater than or equal to a predetermined value. With this principle, when the battery pack 2 is loaded in the battery charger 1, the reed switch 14 becomes closed condition in response to the magnetic force of the magnet 24. As a result, since the output of the battery charger 1 becomes ON, the battery charging control circuit 11 of the battery charger 1 charges the cell 21 mounted in the battery pack 2.

As set forth above, by actuating the reed switch 14 mounted on the main body of the battery charger 1 by the magnetic force of the magnet 24 mounted in the battery pack 2, the output of the battery charger 1 is turned ON only when the predetermined battery pack is loaded, and while the battery pack 2 is not loaded, the output of the battery charger 1 is turned OFF.

Second Embodiment

Figure 3A:
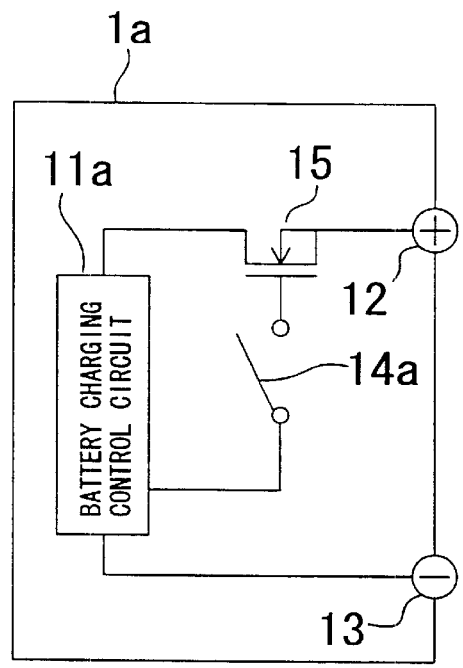
FIG. 3A is a block diagram showing a construction of the second embodiment of the battery charger according to the present invention.
Figure 3B:
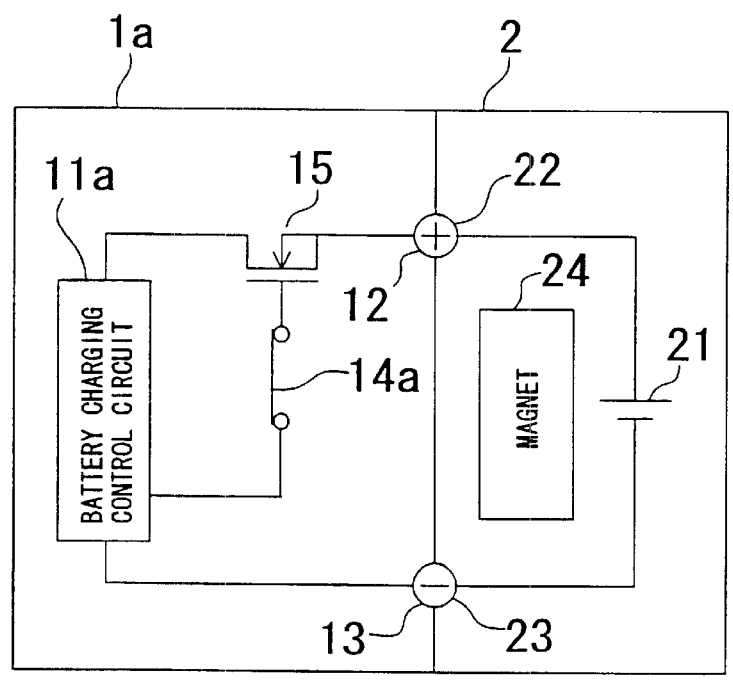
FIG. 3B is a block diagram showing a condition where a predetermined battery pack is connected to the battery charger.

FIG. 3A is a block diagram showing a construction of the second embodiment of the battery charger according to the present invention, and FIG. 3B is a block diagram showing a condition where a predetermined battery pack is connected to the battery charger. The shown embodiment of a battery charger 1a employs an n-channel MOS field effect transistor (hereinafter referred to as FET) 15 as a semiconductor switching element inserted in an output side power source line, as output cut-off means, and a reed switch 14a switching a gate voltage of the FET 15.

Namely, the battery charger 1a outputs a charge current for charging the battery pack 2. In conjunction therewith, the battery charger 1a has a battery charging control circuit 11a outputting a "HIGH" level voltage to be supplied to the gate of the FET 15, a first output terminal 12, a second output terminal connected to an output on negative side of the battery charging control circuit 11a, a reed switch 14a, to one end of which the "HIGH" level voltage from the battery voltage control circuit 11a is input and the other end of which is connected to the gate of the FET 15, and the FET 15 having a drain connected to an output on positive side of the battery charging control circuit 11a, source and a substrate connected to the first output terminal 11. The battery charger 1a is built in the reed switch 14a at the reed switch mounting position A shown in FIG. 2, similarly to the first embodiment. The construction of the battery pack 2 is identical to the first embodiment.

Next, discussion will be given for the operation of the shown embodiment of the battery charger 1a. As shown in FIG. 3A, when the battery pack 2 is not loaded on the main body of the battery charger 1a, the reed switch 14a of the battery charger 1a is held in open condition since it does not subject to magnetic force of the magnet 24 built in the battery pack 2. As a result, since FET 15 is turned OFF, even if the battery charging control circuit 11a outputs the voltage, output of the battery charger 1a is maintained OFF condition.

When the battery pack 2 is loaded on the main body of the battery charger 1a, similarly to the first embodiment, the reed switch 14a built in the battery charger 1a and the magnet built in the battery pack 2 are placed close proximity with each other. Then, the reed switch 14a is subject to the magnetic force of the magnet 24 to be closed condition. Then, the "HIGH" level voltage is supplied to the gate of the FET 15 via the reed switch 14a from the battery charging control circuit 11a. As a result, source-drain of the FET 15 becomes ON condition and output of the battery charger 1a becomes ON. Therefore, the battery charging control circuit 11a charges the cell 21 of the battery pack 2.

As set forth above, even-when the FET 15 and the reed switch 14a are combined, the output of the battery charger 1a is turned ON only when the predetermined battery pack 2 is loaded, and when the battery pack 2 is not loaded, the output of the battery charger 1a is held OFF.

Third Embodiment

Figure 4A:
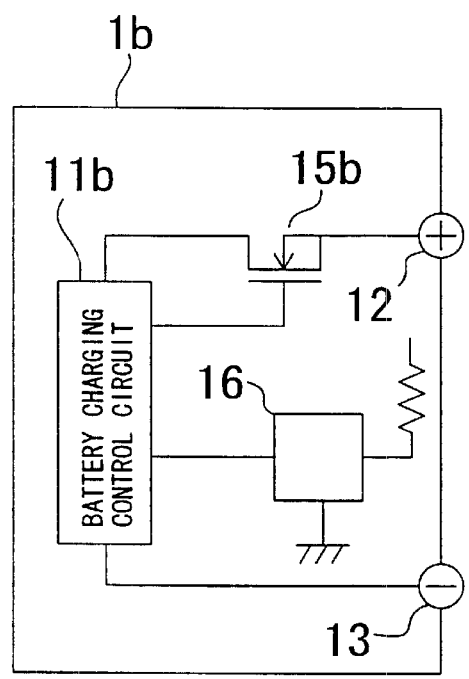
FIG. 4A is a block diagram showing a construction of the third embodiment of the battery charger according to the present invention.
Figure 4B:
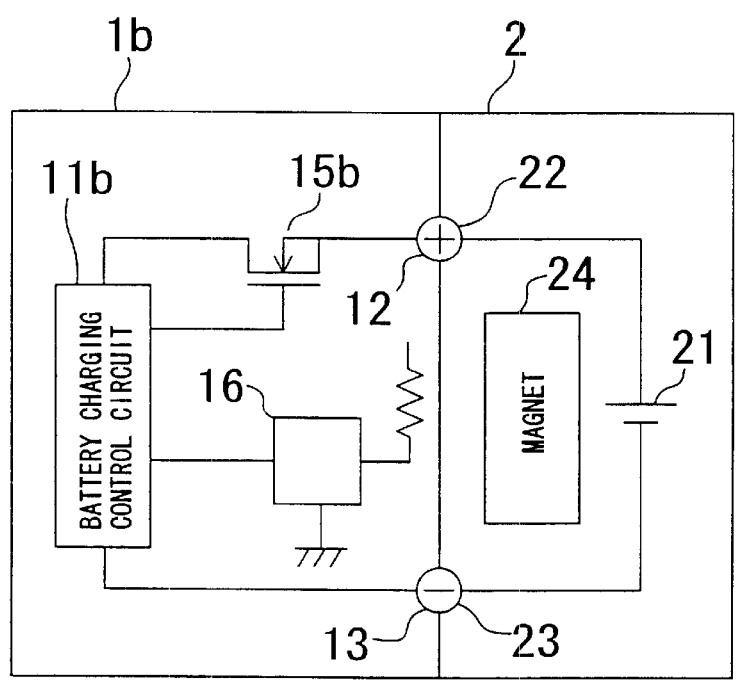
FIG. 4B is a block diagram showing a condition where a predetermined battery pack is connected to the battery charger.

FIG. 4A is a block diagram showing a construction of the third embodiment of the battery charger according to the present invention, and FIG. 4B is a block diagram showing a condition where a predetermined battery pack is connected to the battery charger. The shown embodiment of the battery charger 1b employs an FET 15b inserted in a output side power source line, a Hall IC 16 and a battery charging control circuit 11b for switching a gate voltage of the FET 15b depending upon an output of the Hall IC 16, as output cut-off means.

Namely, the battery charger 1b outputs a charge current and has a battery charging control circuit 11b switching the gate voltage of the FET 15b depending upon the output of the Hall IC 16, the first output terminal 12, the second output terminal connected to an output on negative side of the battery charging control circuit 11a, the FET 15b having drain connected to an output on positive side of the battery charging control circuit 11b, and source and substrate connected to the first output terminal 12, and the Hall IC 16.

The battery charger 1b is built in the Hall IC 16 at the lead switch mounting position A discussed in connection with the first embodiment. The Hall IC is an electronic circuit part activated in response to an intensity of the magnetic furled similarly to the reed switch. The Hall IC 16 employed in the shown embodiment outputs "HIGH" level voltage when magnetic force is not present, and outputs "LOW" level voltage wren a magnetic force greater than or equal to a predetermined value is applied. The construction of the battery pack is identical to the first embodiment.

Next, operation of the shown embodiment of the battery charger 1b will be discussed. As shown in FIG. 4A, when the battery pack 2 is not loaded on the main body of the battery charger 1b, the Hall IC 16 of the battery charger 1b is not subject to the magnetic force of the magnet built in the battery pack 2. Therefore, "HIGH" level voltage OUT is output. The battery charging control circuit 11b receiving this voltage OUT outputs "LOW" level voltage for the gate of the FET 15b to turn the FET 15b OFF condition. Therefore, even if the battery charging control circuit 11b outputs the voltage, the output of the battery charger 1b is held OFF condition.

When the battery pack 2 is loaded in the battery charger 1b, the Hall IC 16 built in the battery charger 1b and the magnet 24 built in the battery pack 2 are placed close proximity with each other. The Hall IC 16 outputs "LOW" level voltage OUT. In response to this voltage OUT, the battery charging control circuit 11b outputs "HIGH" level voltage. As a result, the FET 15b is turned ON condition to make the output of the battery charger 1b ON condition. Then, the battery charging control circuit 11b charges the battery pack 2.

As set forth above, even with the combination of the FET 15b and the Hall IC 16, the output of the battery charger 1a is turned ON only when the predetermined battery pack 2 is loaded, and while the battery pack 2 is not loaded, the output of the battery charger 2 is maintained OFF.

Fourth Embodiment

Figure 5A:
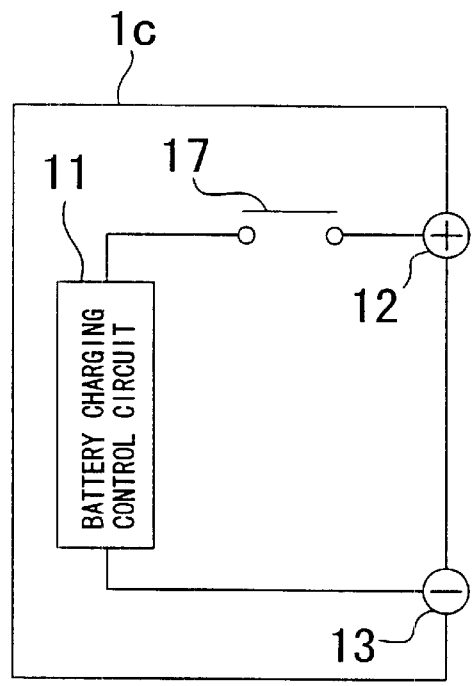
FIG. 5A is a block diagram showing a construction of the fourth embodiment of the battery charger according to the present invention.
Figure 5B:
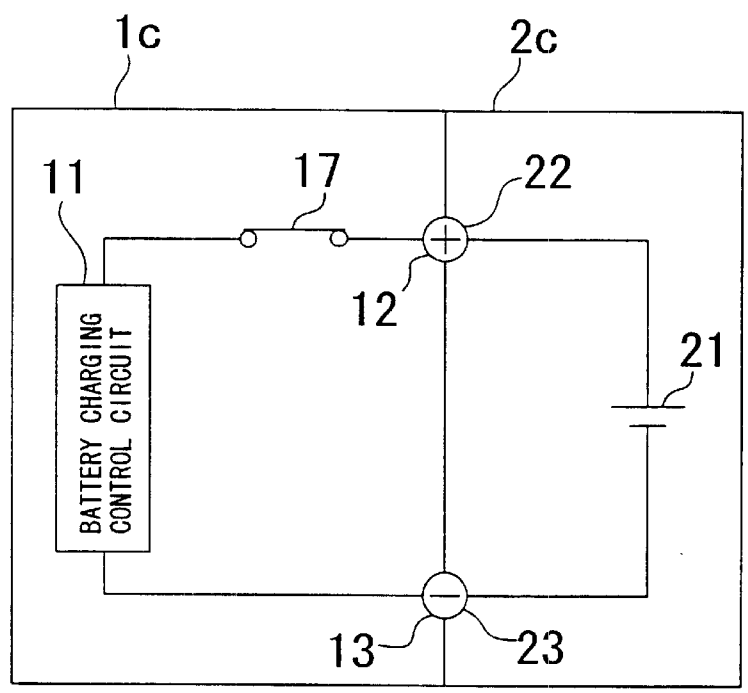
FIG. 5B is a block diagram showing a condition where a predetermined battery pack is connected to the battery charger.
Figure 6:
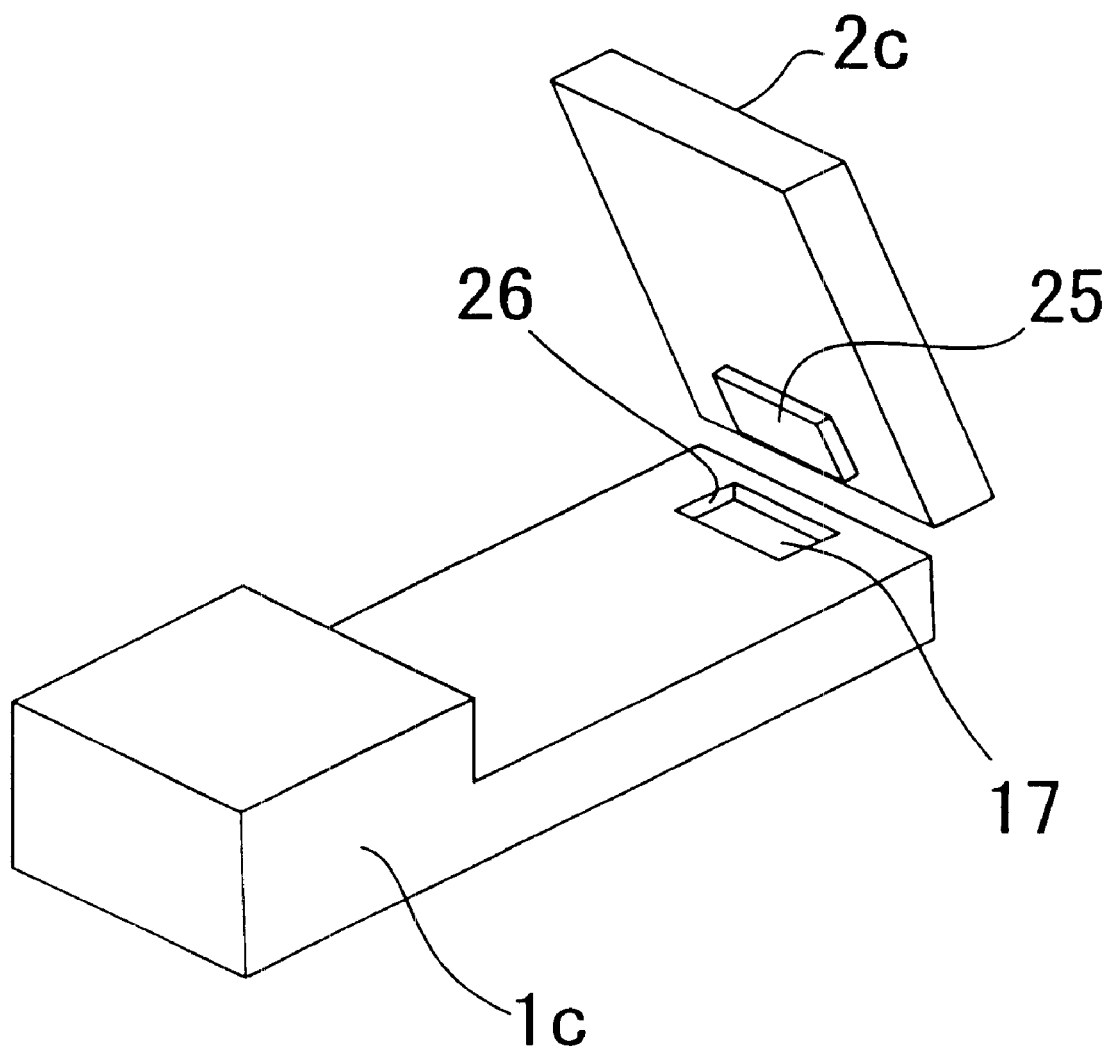
FIG. 6 is an external perspective view of the fourth embodiment of the battery charger according to the present invention and a battery pack.

FIG. 5A is a block diagram showing a construction of the fourth embodiment of the battery charger according to the present invention, FIG. 5B is a block diagram showing a condition where a predetermined battery pack is connected to the battery charger, and FIG. 6 is an external perspective view of the fourth embodiment of the battery charger according to the present invention and a battery pack. The shown embodiment of the battery charger 1c employs a mechanical switch, such as a push switch, inserted in the output side power source line, as the output cut-off means.

Namely, the battery charger 1c includes the battery charging control circuit 11, the first output terminal 12 connected to the output on the positive side of the battery charging control circuit 11, the second output terminal 13 connected to the output on the negative side of the battery charging control circuit 11 and a push switch 17 inserted between the output terminal 12 and the battery charging control circuit 11 in series.

On the other hand, the battery pack 2c has the cell 21, the positive terminal 22 connected to positive side of the cell 21, and the negative terminal 23 connected to the negative side of the cell 21.

As shown in FIG. 6, on the main body of the battery charger 1c, a recessed portion 26 is provided on a surface located in opposition to the battery pack 2c. In order to prevent erroneous operation, the push switch 17 is provided on the bottom of the recessed portion 26 so that a key top of the push switch 17 will never project from the surface of the main body of the battery charger 1c.

On the other hand, in the battery pack 2c, a projecting portion 25 formed of a molded resin is provided. As loaded in the battery charger 1c, the projecting portion 25 depresses the push switch 17.

Here, as the push switch 17, a NO (normally open) type which is closed as depressed is premised. The projecting portion 25 of the battery pack 2c has to be a shape which can located mating with the key top of the push switch 17 and can sufficiently depress the key top.

Next, operation of the battery charger 1c of the shown embodiment will be discussed. As shown in FIG. 5A, the batter pack 2c is not loaded in the main body of the battery charger 1c, the push switch 17 is held open. As a result, even if the battery charging control circuit 11 outputs the voltage, the output of the battery charger 1c is held OFF condition.

When the battery pack 2c is loaded in the battery charger 1c and the projecting portion 25 engages with the recessed portion of the battery charger 1c, the push switch 17 built in the battery charger 1c is depressed by the projecting portion 25 provided on the battery pack 2c and thus closed. As a result, the output of the battery charger 1c becomes ON condition. The battery charging control circuit 11 of the battery charger 1 charges, the cell 21 mounted on the battery pack 2c.

As set forth above, with the construction, in which the mechanical switch is inserted in the output side power source line of the battery charger 1c so that the mechanical switch is turned ON when the predetermined battery pack 2c is loaded. In the condition where the battery pack 2c is not loaded, the output of the battery charger 1c can be held OFF condition.

It should be noted that, in the third embodiment shown in FIG. 4, the push switch 17 may be employed in place of the Hall IC 16. Namely, by connecting one of the contact of the push switch 17 to the grounded, and pulling up the other end of the push switch 17, and also, connecting the other end to the battery charging control circuit 11b as in the case of Hall IC 16, the push switch 17 is held OPEN when the battery pack 2c is not loaded to input "HIGH" level voltage to the battery charging control circuit 11b. When the push switch 17 is placed in closed condition as depressed by the projecting portion 25 of the battery pack 2c to input "LOW" level voltage to the battery charging control circuit 11b. Thus, similar operation as the third embodiment can be realized.

With the present invention, output cut-off means is provided so that when the predetermined secondary battery is not loaded, connection between the output terminal and the battery charging control means is cut off to turn the output OFF, and when the predetermined secondary battery is loaded, the output terminal and the battery charging control means are connected to make output ON. Thus, even if the output terminal exposed in the condition where the secondary battery is not loaded, is shorted by metal or the like, heating or element break down of the battery charger can be avoided to enhance security. On the other hand, even when the battery other than the dedicated secondary battery is to be charged, output becomes OFF. Therefore, erroneous charging of the secondary battery other than dedicated one will never be caused to avoid damaging of the secondary battery or leakage of battery fluid.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A battery charger comprising:

battery charging control means for supplying a charge current to a predetermined secondary battery via an output terminal; and output cut-off means for cutting off connection between said output terminal and said battery charging control means when said predetermined secondary battery is not loaded and for establishing connection between said output terminal and said battery charging control means when said predetermined secondary battery is loaded.

2. A battery charger as set forth in claim 1, wherein said output cut-off means has a contact inserted between said output terminal and said battery charging control means in series, and is constructed with a magnetic field detecting switch which closes said contact when a magnetic field by magnetic field generating means built in said predetermined secondary battery is detected.

3. A battery charger as set forth in claim 2, wherein said magnetic field generating means is a magnet and said magnetic field detecting switch is a reed switch.

4. A battery charger as set forth in claim 1, wherein said output cut-off means comprises:

magnetic field detecting means for detecting a magnetic field by magnetic field generating means built-in said predetermined secondary battery; and a switching element inserted between said output terminal and said battery charging control means in series and connecting said output terminal and said battery charging control means when said magnetic field is detected by said magnetic field detecting means.

5. A battery charger as set forth in claim 4, wherein said magnetic field generating means is a magnet, said magnetic field detecting means is a reed switch and said switching element is a field effect transistor.

6. A battery charger as set forth in claim 4, wherein said magnetic field generating means is a magnet, said magnetic field detecting means is a Hall IC, and said switching element is field effect transistor.

7. A battery charger as set forth in claim 1, wherein said output cut-off means comprises a mechanical switch inserted between said output terminal and said battery charging control means in series and closing said contact in response to operation of a predetermined member provided in said predetermined secondary battery.

8. A battery charger as set forth in claim 7, wherein said predetermined member provided on said predetermined secondary battery is a projecting portion, and a recess to engage with said projecting portion is formed in a main body of said battery charger, and said mechanical switch is provided on a bottom of said recessed portion.

9. A battery charger as set forth in claim 1, wherein said output cut-off means comprises:

a mechanical switch opened and closed depending upon operation by a predetermined member arranged in said predetermined secondary battery; and a switching element inserted between said output terminal and said battery charging control means in series and establishing connection between said output terminal and said battery charging control means when said mechanical switch is placed in a condition indicative of loading of the predetermined secondary battery.

* * * * *